Jan. 8, 1946. J. M. AVERY ET AL 2,392,629
METHOD OF MAKING CARBON BISULPHIDE
Filed Jan. 21, 1942 2 Sheets-Sheet 1

INVENTORS
JULIAN M. AVERY
& LEROY F. MAREK
BY
Frank N. Houghton, Agent

INVENTORS
JULIAN M. AVERY
& LEROY F. MAREK

Patented Jan. 8, 1946

2,392,629

UNITED STATES PATENT OFFICE 2,392,629

METHOD OF MAKING CARBON BISULPHIDE

Julian M. Avery, Shaker Heights, Ohio, and Leroy F. Marek, Lexington, Mass., assignors to Arthur D. Little, Inc., Cambridge, Mass., a corporation of Massachusetts Application January 21, 1942, Serial No. 427,538

14 Claims. (Cl. 23—206)

This invention relates to the art of producing carbon bisulphide. In particular, it is directed to a new and improved process whereby carbon bisulphide may be prepared in a continuous manner, without requiring electrical energy as the principal source of heat, and under conditions such that the amount produced is greatly in excess of the one pound or less per hour per cubic foot of reactor volume obtained in the best of the present commercial processes known to us. Another feature of the present invention is that carbon tetrachloride may be produced as a by-product or a co-product, or as an alternative final product, by suitable modifications of the process.

Commercial production of carbon bisulphide is based upon the reaction of sulphur vapor on carbon at temperatures upwards of about 800° C. It is customarily carried out either as a batch operation in externally fired retorts, or as a continuous operation in internally heated electric furnaces. Each of these methods presents serious drawbacks connected with vaporization of sulphur, and the application of heat in an efficient, controlled and economical manner. The advantages of the process of this invention will be evident from the discussion which follows and by reference to the accompanying drawings.

The vaporization of sulphur in a continuous manner permitting controlled feeding of sulphur vapor at a high rate and with proper distribution throughout the cross section of active carbon in the retort or furnace where the reaction takes place, is inherently difficult because of the peculiar physical properties of sulphur.

When pure sulphur is heated, it first melts at about 115° C. to a liquid having a viscosity about 10-fold that of water at room temperature. Then beginning at about 150° C. and increasing very rapidly at 160° C. it undergoes a polymerization-like change which causes an extreme increase in viscosity to over 50,000-fold that of room-temperature water in the temperature interval of about 170° to 200° C. and finally as the temperature is raised further it becomes progressively less viscous until at the normal boiling point of 444.7° C. it has a viscosity of about 80-fold that of room-temperature water. Room-temperature water has a viscosity just under 1.0 centipoise. This region of extremely high viscosity gives sulphur the characteristic behavior of a resolidification during heating and makes it impossible to vaporize sulphur in continuously-fed, tubular heaters for supplying a zone of reactive carbon with sulphur vapor to form carbon bisulphide. For that reason carbon and sulphur are sometimes mixed in required proportions, as in the batch retort process, and charged at suitable intervals to the heated retort. Alternatively, as in the electric furnace method, a bed of active carbon is maintained in a furnace by charging the carbon through the top of the furnace at suitable intervals, and usually sulphur is fed as required, near the bottom of the furnace. In this case heat required to maintain temperature conditions within the active carbon mass is developed by passing electric current through the carbon by means of suitably disposed electrodes. This method, while effective and offering the advantages of continuous operation, nevertheless requires the use of expensive electric power, and does not afford good control over temperature conditions throughout the carbon mass, or over the distribution of sulphur vapor as it passes through the carbon mass.

In accordance with the present invention, these and other difficulties with the known processes are overcome by the utilization of an agent or agents which serve to maintain the viscosity of the sulphur, when in the molten condition, below about 500 centipoises. These agents, which for convenience are referred to herein as "fluidifying agents," act upon the molten sulphur generally either as solvents therefor, or as inhibitors of the polymerization-like changes which cause the extremely high viscosity of the molten sulphur. These fluidifying agents are considered to be effective for the purposes of this invention when they hold the viscosity of the sulphur treated by them, when the sulphur is above its melting point, at less than about one per cent of the maximum viscosity attained by molten sulphur alone.

Briefly stated, the present invention comprises the steps of vaporizing totally a reaction mixture having a maximum viscosity, when molten, of less than about 500 centipoises and containing sulphur capable of reacting with heated carbonaceous material to form carbon bisulphide; reacting the vapors and carbonaceous material at a temperature in excess of about 700° C.; and recovering or further reacting the resulting carbon bisulphide.

The first of the foregoing steps of this process may be carried out with the use of any one of a number of fluidifying agents. It is important that the reaction mixture formed from them should possess four characteristics—first, it should have a maximum viscosity, when molten, of less than about 500 centipoises; second, it should contain sulphur which is capable of combining with heated carbonaceous material to form carbon bisulphide when vaporized; third, it should be capable of being completely volatilized to form vapor; and fourth, the fluidifying agent should not react under the conditions of the process to form undesirable compounds.

We have found that a number of substances are useful as fluidifying agents for the preparation of such reaction mixtures. Among such substances are the halogens and sulphur halides; various organic sulphides such as carbon bisulphide, benzothiazyl bisulphide, phenyl phosphine sulphide, and tetramethyl thiuram bisulphide; and a number of non-sulphur-bearing aromatic hydrocarbon derivatives, including alpha naphthol, alpha chloronaphthalene, alpha bromonaphthalene, p-dibromobenzene, p-cyclohexyl phenol, aniline, butyraldehyde aniline, triphenyl phosphate, and various guanidines such as diphenyl guanidine and di-o-tolyl guanidine.

The amount of any given fluidifying agent required in practicing this invention depends upon the effectivenes of the particular agent for the purpose, and also upon the extent to which it forms a compound or compounds with sulphur. This invention is not predicated upon actual chemical reaction between sulphur and the fluidifying agents to form specific compounds, although such reactions take place in some instances, while in others the association between the sulphur and the fluidifying agent may be purely physical. The resulting compositions of sulphur and fluidifying agent, whether or not containing chemical compounds of the two, are referred to herein as reaction mixtures, for convenience. However, when chemical compounds are formed, the fluidifying agent should obviously not be used in so large an amount as to leave no uncombined sulphur available for reaction with carbon to form carbon bisulphide. This may be illustrated by reference to the use of chlorine as a fluidifying agent.

A mixture containing sulphur and chlorine wherein the atomic ratio of sulphur to chlorine is less than 1 to 2 produces little or no carbon bisulphide when in contact with a suitable form of carbon at temperatures above about 700° C. A mixture containing sulphur and chlorine wherein the atomic ratio of sulphur to chlorine is between 1 to 2 and 2 to 2, however, will react with carbon to form both sulphur bichloride and carbon bisulphide, and some carbon tetrachloride under certain conditions. Mixtures containing sulphur and chlorine wherein the atomic ratio of sulphur to chlorine is substantially greater than 2 to 2 usually react with carbon to form essentially carbon bisulphide with little or no carbon tetrachloride, except under special conditions as hereinafter described. Accordingly, it is important that the sulphur in the halide mixtures be present in sufficient amounts or in such a condition that it will combine with heated carbon to form carbon bisulphide when vaporized.

The other fluidifying agents are generally required in only small amounts, usually less than about 5 per cent.

An important property possessed by each of the foregoing reaction mixtures of sulphur and fluidifying agent is that of a maximum viscosity, when molten, below about 500 centipoises, as compared with a maximum viscosity, when molten, of about 50,000 centipoises for pure sulphur. One practical advantage of this property of the foregoing reaction mixtures is that they may be heated from room temperature to volatilizing temperatures and volatilized completely while passing continuously through suitable tubular heaters.

Any suitable method may be employed to determine the viscosity of a substance whose use in this process is contemplated. The viscosity values set forth herein were determined through the use of a Stormer viscosimeter which was not equipped with a central vane. The reaction mixture may be vaporized in any suitable manner, for example, by being passed continuously through a tube immersed in a bath having a temperature above the vaporization temperature of the total mixture. Passing the mixture through a metal tube about one inch in diameter immersed in a bath of molten lead has, for example, been found to be satisfactory for total vaporization of sulphur-chlorine mixtures ranging from pure sulphur monochloride ($S_2Cl_2$) to mixtures containing at least 80% sulphur by weight.

The second of the hereinbefore-mentioned steps of this process, viz: reacting the vapors of the reaction mixture with heated carbonaceous material, may be carried out in any suitable way, for example, by bringing the vapors into effective contact with heated charcoal at temperatures above about 700° C.

The third step, namely that of separating the resulting carbon bisulphide from the other reaction products, may be carried out in any suitable way, for example, by condensation and fractionation.

The present process will be better understood by those skilled in the art from the following detailed description of the process as applied to one of the foregoing substances:

Sulphur is added to sulphur monochloride with stirring or agitation so that the resultant solution contains about 65% sulphur and 35% sulphur monochloride. This solution is vaporized in any convenient manner, as for example by being forced through a metal tube immersed in a bath of molten lead. The resulting vapors are then preferably super-heated to above about 700° C., and passed through a reactor chamber containing a quantity of carbonaceous material, preferably charcoal. A reaction takes place between the vaporized sulphur and the charcoal at temperatures above about 700° C., with the result that carbon bisulphide and other products are formed.

The gaseous products withdrawn from the reactor chamber may and usually do contain relatively small amounts of noncondensible gases such as $SO_2$, $CO_2$ and $H_2S$, which may be vented from the system, in addition to condensible gases such as sulphur chlorides, unreacted sulphur, carbon bisulphide and carbon tetrachloride. These condensible gases are condensed and then fractionated, preferably by the application of the sensible heat of the gases issuing from the reactor chamber, and the resulting commercially pure carbon bisulphide (and carbon tetrachloride, if present) is separated therefrom. The sulphur chloride of the condensate may be reused in the first steps of the process to dissolve more sulphur, in which case the process is characterized by a substantially closed cycle of sulphur chloride circulation.

When it is desired to obtain carbon tetrachloride as a by-product or co-product of this invention, it is only necessary to cool the aforementioned gaseous reaction products slowly to a temperature between about 200° C. and about 20° C., for it is within this temperature range that sulphur chloride and carbon bisulphide react to form carbon tetrachloride. If it is desired to produce carbon tetrachloride as a principal product of the process, free chlorine may be introduced into the gaseous products of reaction in sufficient quantity to convert substantially all of the carbon bisulphide to carbon tetrachloride, in which event the end products of the process would be principally carbon tetrachloride and sulphur chloride, plus any tail gases, and with or without some free sulphur.

Inasmuch as there is incurred a small loss of the fluidifying substance used to treat the sulphur with every pass of the reaction mixture through the system, provision must be made for replenishment. The preferred method of maintaining the amount of this substance in the system is to introduce it directly into the treating tank; for example, if sulphur chloride is the substance employed, free chlorine may be introduced directly into the sulphur-chlorine mixture contained in the treating tank, thereby forming the required make-up quantity of sulphur chloride.

Sulphur and carbonaceous material must of course be added to the system as required, to replace the sulphur and carbon which are removed in the form of $CS_2$, $SO_2$, $CO_2$ and the like. Preferably the sulphur is added in the treating tank while the contents of that vessel are maintained at a temperature between about 75° C. and about 100° C., and the carbonaceous material (e. g. charcoal), may be conveniently introduced into the system through a suitable opening at the top of the reactor chamber. Since commercial charcoal ordinarily contains significant amounts of hydrogen and oxygen, which cause the production, during the reaction, of gases such as $H_2S$, $SO_2$ and $CO_2$ which waste the reactants, such charcoal is preferably first calcined, in the usual manner for treating charcoal for use in producing carbon bisulphide by conventional processes.

In the drawings accompanying and forming a part of this specification:

Figure 1:
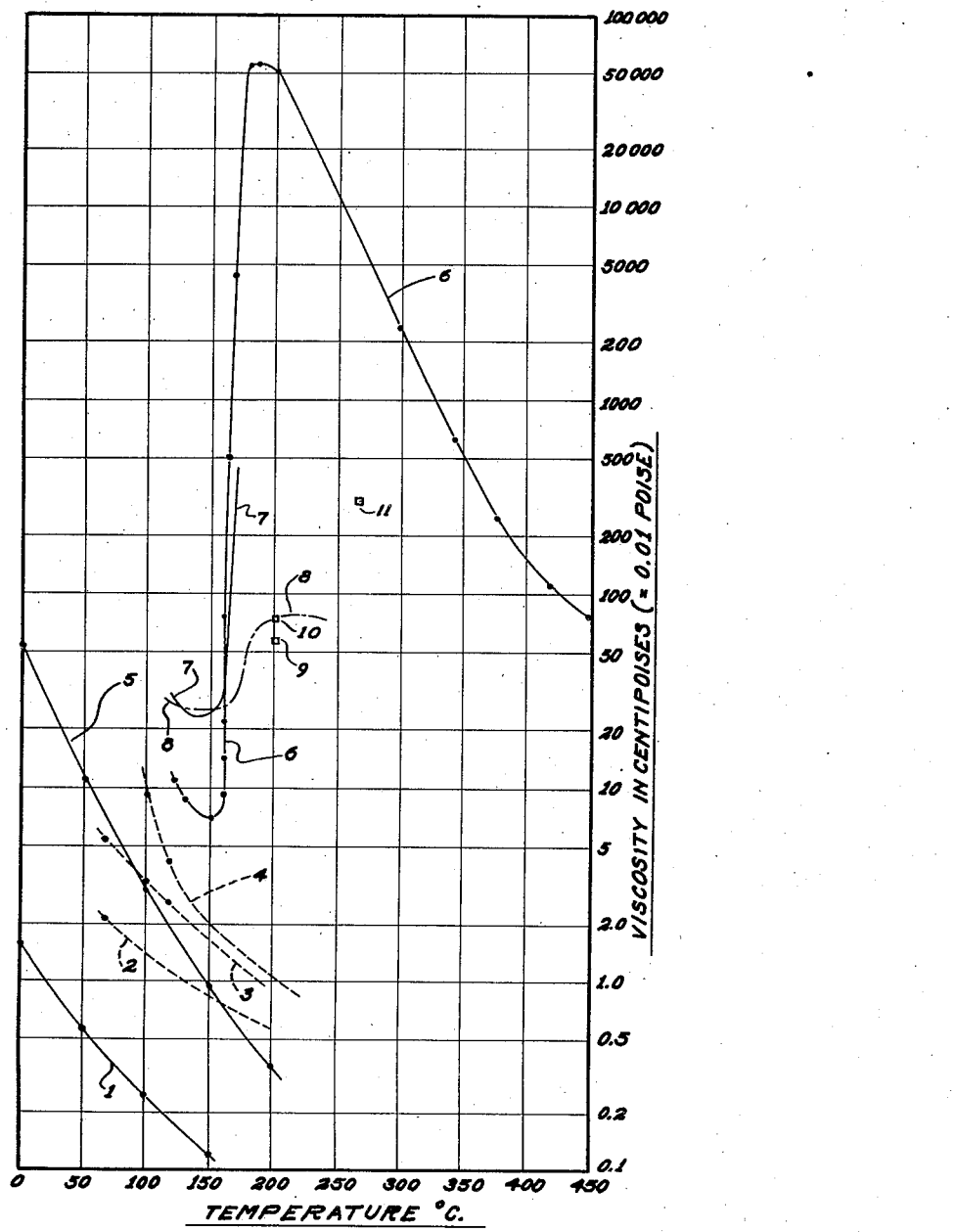
Figure 1 is a semi-logarithmic chart carrying curves which indicate the viscosity values, in centipoises, through certain temperature ranges of certain herein-named substances in the liquid phase.

In Figure 1, viscosity in centipoises is plotted against temperature in degrees centigrade. It will be noted that the chart bears eight curves, five of which are similar in that they show that the viscosity varies inversely as the temperature. Curves 1, 2, 3, 4, and 5 are the five to which reference is had and these curves show, respectively: the viscosity of water; and of mixtures of sulphur chloride and sulphur containing 64.5% sulphur and 35.5% chlorine, 80% sulphur and 20% chlorine, 86.5% sulphur and 13.5% chlorine, and of 98% sulphuric acid.

Curve 6 shows the viscosity of pure sulphur between its melting point and its boiling point. This curve shows initially, a decrease in viscosity with an increase in temperature followed by extremely rapid increase in viscosity with relatively small increases in temperature in the range from 160° C. to about 190° C. Pure sulphur attains a maximum viscosity of about 56,000 centipoises at about 190° C.; thereafter the viscosity decreases with increasing temperature until the viscosity becomes less than 100 centipoises at the boiling point of pure sulphur.

Curve 7 shows the viscosity in the low temperature range of the commercial sulphur used in the tests of the several fluidifying agents whose effects are described herein.

When a mixture containing 98% commercial sulphur and 2% alpha naphthol is heated through the range between its fusion and its vaporization temperature, it acts in the manner shown by curve 8. A comparison between that curve and curve 6 indicates that the maximum viscosity attained by the alpha naphthol-sulphur mixture is much less than 1% of the maximum viscosity attained by pure sulphur.

In addition to the eight curves above described, three points appear upon the chart which illustrate the marked effects that three different fluidifying agents have upon the viscosity of heated, molten sulphur.

A mixture containing 99% sulphur and 1% para cyclo hexyl phenol has a viscosity of 62 centipoises at 200° C., as shown by point 9. Point 10 indicates the viscosity at 200° C. of a mixture containing 99% sulphur and 1% alpha naphthol. Point 11 shows the viscosity at 268° C. of a mixture containing 99.23% sulphur and 0.77% iodine.

It will be understood that curves 2, 3, 4 and 8 and points 9, 10, and 11 represent the performance of the mixture identified thereby in respect to viscosities and indicate that these fluidifying agents are suitable for use with this invention.

Figure 2:
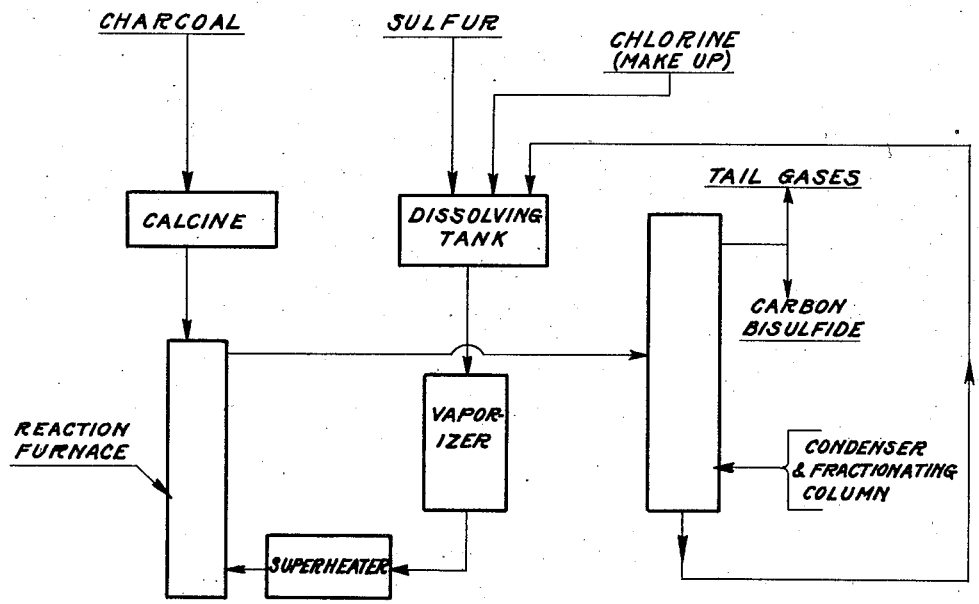
Figure 2 is a diagrammatic flow-sheet which indicates an advantageous sequence of steps in carrying out the present invention for making carbon bisulphide from sulphur when using sulphur chloride (or chlorine) as the fluidifying agent.

The process as depicted by Figure 2 may be considered to be begun when sulphur and chlorine are introduced into the "dissolving tank." Upon completion of the dissolving or mixing step, the resulting reaction mixture is passed to the "vaporizer" where it is completely vaporized and sent on to the "superheater." After the vapors are sufficiently superheated, they pass into the "reaction furnace" where they react with the charcoal to form carbon bisulphide. The resulting gaseous reaction products then pass into the "condenser and fractionating column," wherein the temperature of the gases is reduced sufficiently to liquefy the readily condensible products including carbon bisulphide and sulphur chloride; the difficultly condensible gases such as $H_2S$ and $CO_2$ are vented as indicated by "tail gases." The carbon bisulphide and sulphur chloride are readily separated by fractionation; the latter is then available for recycling in the process if desired. The charcoal used in the reaction, after calcination as indicated, may be fed to the reaction furnace as desired through a double bell hopper to prevent escape of gases from the sytem.

Having thus described the present invention so that others skilled in the art may be able to understand and practice the same, we state that what we desire to secure by Letters Patent is defined in what is claimed.

What is claimed is:

1. The process of producing carbon bisulphide which comprises the steps of producing a liquid sulphur composition containing a sulphur halide in substantial proportion and in which the ratio of sulphur to halogen content is greater than 0.5, said liquid composition having a maximum viscosity of less than about 500 centipoises, vaporizing said composition, reacting said vapors with carbonaceous material at a temperature above about 700° C. so as to produce reaction products containing carbon bisulphide, cooling the reaction products, and recovering carbon bisulphide therefrom.

2. The process of producing carbon bisulphide which comprise the steps of producing a liquid sulphur composition containing a mixture of sulphur halides in substantial proportion and in which the ratio of sulphur to halogen content is greater than 0.5, said liquid composition having a maximum viscosity of less than about 500 centipoises, vaporizing said composition, reacting said vapors with carbonaceous material at a temperature above about 700° C. so as to produce reaction products containing carbon bisulphide, cooling the reaction products, and recovering carbon bisulphide therefrom.

3. The process according to claim 1 wherein the carbonaceous material is calcined wood charcoal.

4. The process of making carbon tetrachloride which comprises producing liquid sulphur composition containing sulphur chloride in substantial proportion, and in which the ratio of sulphur to chlorine content is greater than 0.5, said liquid composition having a maximum viscosity of less than about 500 centipoises, vaporizing said composition, reacting said vapors with carbonaceous material at a temperature above about 700° C. so as to produce products containing carbon bisulphide, cooling such reaction products, and recovering carbon tetrachloride from the reaction products.

5. The process of making carbon tetrachloride which comprises producing liquid sulphur composition containing sulphur chloride in substantial proportion, and in which the ratio of sulphur to chlorine content is greater than 0.5, said liquid composition having a maximum viscosity of less than about 500 centipoises, vaporizing said composition, reacting said vapors with carbonaceous material at a temperature above about 700° C. so as to produce products containing carbon bisulphide, cooling such reaction products, adding free chlorine to the reaction products so as to produce carbon tetrachloride and recovering carbon tetrachloride from the reaction products.

6. The process of making carbon tetrachloride which comprises producing liquid sulphur composition containing sulphur chloride in substantial proportion, and in which the ratio of sulphur to chlorine content is greater than 0.5, said liquid composition having a maximum viscosity of less than about 500 centipoises, vaporizing said composition, reacting said vapors with carbonaceous material at a temperature above about 700° C. so as to produce products containing carbon bisulphide, cooling the reaction products to a temperature between about 200° C. and about 20° C., adding free chlorine to the reaction products, holding said reaction products within said temperature range for a sufficient time to form carbon tetrachloride, and recovering carbon tetrachloride from the resulting products.

7. The process according to claim 6 wherein an unreacted portion of the sulphur-containing substance is recovered from the reaction products and recycled through the system together with an addition of sulphur to compensate for sulphur used in the preceding reaction.

8. The process according to claim 4 wherein an unreacted portion of the sulphur composition containing sulphur chloride is recovered from the reaction products and recycled through the system together with an addition of sulphur and chlorine to compensate for use of sulphur and sulphur chloride used in the preceding reaction.

9. The process according to claim 2 in which the halides are chlorides.

10. The process according to claim 1 in which the halide is a chloride.

11. The process according to claim 2 in which an unreacted portion of the reactable-sulphur-containing substance is recovered from the resulting reaction products and recycled through the system together with an addition of sulphur to compensate for sulphur used in the preceding reaction.

12. The process of making carbon bisulphide which comprises producing a liquid sulphur composition containing a sulphur chloride in substantial proportion and in which the ratio of sulphur to chlorine content is between about 0.5 and 1.0, said liquid composition having a maximum viscosity of less than about 500 centipoises, vaporizing said composition, reacting said vapors with carbonaceous material at a temperature above about 700° C. so as to produce reaction products containing carbon bisulphide, and recovering carbon bisulphide therefrom.

13. The process of making carbon tetrachloride which comprises producing liquid sulphur composition containing sulphur chloride in substantial proportion, and in which the ratio of sulphur to chlorine content is between 0.5 and 1.0, said liquid composition having a maximum viscosity of less than about 500 centipoises, vaporizing said composition, reacting said vapors with carbonaceous material at a temperature above about 700° C. so as to produce products containing carbon bisulphide, cooling the reaction products to a temperature between about 200° C. and 20° C. and holding said products within said temperature range for a sufficient time to cause formation of carbon tetrachloride, and recovering carbon tetrachloride from the resulting reaction products.

14. The process of producing carbon bisulphide which comprises producing a fluid sulphur composition containing sulphur and a viscosity inhibiting agent and in which the weight ratio of sulphur to viscosity inhibiting agent content is greater than 0.5 said fluid composition having a maximum viscosity of less than about 500 centipoises, conducting the fluid mixture through a heated zone, vaporizing said fluid mixture into a reacting zone, reacting said vapors with carbonaceous material at a temperature above about 700° C. so as to produce reaction products containing carbon bisulphide, cooling the reaction products, and recovering carbon bisulphide therefrom.

LEROY F. MAREK.
JULIAN M. AVERY.